United States Patent
Weidman et al.

[11] 3,725,921
[45] Apr. 3, 1973

[54] TRAFFIC RESPONSIVE SPEED CONTROL SYSTEM

[75] Inventors: Joseph S. Weidman, Walled Lake; Henry C. Yee, Royal Oak; Jack G. Elliott, Farmington; Zaven Margosian, Birmingham, all of Mich.

[73] Assignee: The Bendix Corporation, Southfield, Mich.

[22] Filed: Nov. 4, 1970

[21] Appl. No.: 86,922

[52] U.S. Cl. ............................. 343/7 ED, 180/82.1
[51] Int. Cl. ............................. G01s 9/04, G01s 9/46
[58] Field of Search ..... 343/7 ED; 180/82.1, 98, 105; 354/4

[56] References Cited

UNITED STATES PATENTS

| | | | |
|---|---|---|---|
| 3,493,920 | 2/1970 | MacMunn | 343/7 ED |
| 3,442,347 | 5/1969 | Hodgson et al. | 343/7 ED |
| 3,337,866 | 8/1967 | Gisonno | 343/7 ED |
| 2,804,160 | 8/1957 | Rashid | 180/82.1 |
| 3,385,964 | 5/1968 | Clejan et al. | 343/7 ED |
| 3,476,204 | 11/1969 | Westby et al. | 180/98 |

Primary Examiner—Benjamin A. Borchelt
Assistant Examiner—G. E. Montone
Attorney—Lester L. Hallacher and Plante, Hartz, Smith and Thompson

[57] ABSTRACT

A system for automatically adjusting the speed of a vehicle to existing traffic conditions is described. The system functions in conjunction with an automatic speed control system to maintain a safe following distance between vehicles traveling in the same direction. A range and range-rate sensor generates signals which are indicative of the distance between the vehicles, as well as the closing or opening velocity of the vehicles. These signals are used to accelerate or decelerate the trailing vehicle to maintain a safe and optimum distance between the vehicles in accordance with the speed of the lead vehicle. The system is non-cooperative, so that the lead vehicle need not be similarly equipped in order for the system to operate. The system is capable of overriding the speed control system within the vehicle but can be overridden by the driver when a deceleration or acceleration decision is executed. Although the system can override the speed control system, the speed set into the speed control system can not be exceeded except by driver override. However, overriding of the speed control system by the invention system or by driver override does not destroy the speed set by the driver.

30 Claims, 5 Drawing Figures

TRAFFIC RESPONSIVE SPEED CONTROL SYSTEM

CROSS-REFERENCES TO RELATED APPLICATIONS AND PATENTS

U. S. Pat. No. 3,455,411, entitled AUTOMOBILE SPEED CONTROL, by R. W. Carp, et al.

U. S. Pat. No. 3,659,293 entitled RANGE DETECTING DOPPLER RADAR, by Radhar Gupta.

U. S. application Ser. No. 75,056, filed Sept. 24, 1970, entitled DIPLEX MULTI-FREQUENCY CW DOPPLER RADAR, by William R. Faris.

The above-referenced disclosures are assigned to Bendix Corporation, the assignee of the instant application, and fully describe subsystems which can optionally be employed in the inventive system.

BACKGROUND OF THE INVENTION

The continual increase in population of vehicles on the nation's roadways emphasizes the need for a system for automatic vehicle control which simultaneously enhances driver safety and decreases congestion. This is particularly true around urban areas where accidents and congestion are continually increasing. Several types of automatic vehicle control systems of varying sophistication have been proposed in the past. The most sophisticated type of system is an automatic collision avoidance system. These systems are intended to monitor the highway appearing before the traveling vehicle so that hazardous passing or driving conditions can be avoided. Accordingly, a driver attempting to pass a vehicle will be forewarned or prevented from passing if the possibility of a head-on collision with an oncoming vehicle exists. Alternatively, a vehicle traveling in the same direction as the radar-equipped vehicle, and which is involved in a collision or suddenly slows for some reason, presents a hazardous condition which would automatically be avoided by the instantaneous braking or turning of the collision avoidance equipped vehicle. The collision avoidance system is therefore capable of overriding the driver's attempts at controlling the vehicle in such instances.

It has also been proposed to adapt a collision avoidance system such that it is capable of automatically maintaining a safe traveling distance between vehicles traveling in the same direction. Accordingly, this type of system would constitute a complete safety control package, in that it would avoid head-on and rear-end collisions and simultaneously optimize traffic flow through congested areas. Although such systems are theoretically feasible, they are economically infeasible and accordingly have not been adopted as of the present date.

Various types of systems are available for automatically maintaining a preselected velocity for the vehicle. These systems are a driver convenience and provide little or no safety. The vehicle is held at a preselected speed which is chosen by the driver consistent with prevailing traffic conditions. This type of system then automatically maintains the vehicle at the preselected velocity irrespective of road grade, wind conditions, and without attention from the driver. However, the driver can assume control of the vehicle velocity by either braking or accelerating the vehicle at his option. This type of system is very convenient for the driver, especially for turnpike and long-distance driving where a constant speed can be held for a relatively long period of time. However, such a system has little or no safety value and does not assist in maintaining smooth traffic flow in congested areas.

Because of the infeasibility of adopting a completely automatic collision avoidance system and because the presently existing automatic speed control systems are lacking in safety features, a type of system which falls between the two would constitute a marked improvement over the present state of the art. A system which would lie between the afore-described types of systems would include a system which would offer automatic speed control of the vehicle and simultaneously provide a means wherein the trailing vehicle is maintained at an optimum trailing distance behind the lead vehicle. This would greatly improve the flow of traffic through congested areas and simultaneously provide some safety features, because the driver of the automatically controlled vehicle would be presented visual or audible signals indicative of potentially hazardous conditions, and also because a safe following distance would be maintained. However, the system would not attempt to completely assume control of the vehicle to avoid all types of hazardous conditions.

SUMMARY OF THE INVENTION

The inventive system is directed to an adaptive speed control system, and accordingly automatically maintains a safe trailing distance between two vehicles. The inventive system operates in conjunction with an automatic speed control system, and therefore provides both driver convenience and safety features while simultaneously assisting in the optimization of traffic flow through congested areas.

The system includes an active energy source which can be optical or microwave, so that energy is transmitted from the system within the trailing vehicle and is reflected back from a leading vehicle. The reflected signal contains information indicative of the range to the lead vehicle and the relative velocity of the two vehicles. The return signal is then processed to automatically accelerate or decelerate the trailing vehicle to maintain an optimum following distance in accordance with the speed of the lead vehicle. Because energy is transmitted from the system and reflected energy is received back, the system is noncooperative and therefore does not require an identical system in the lead vehicle.

The system operates in conjunction with an automatic speed control system and is capable of overriding the control function of the speed control system so that a driver can conveniently set his vehicle to a preselected desired speed and automatically maintain this speed. When the vehicle comes up upon a slower traveling vehicle, the adaptive speed control system automatically slows the trailing vehicle so that it assumes the speed of the lead vehicle. The controlled vehicle will then continue at this speed automatically and will accelerate and decelerate in accordance with the acceleration and deceleration of the lead vehicle. However, if desired, the driver can override the adaptive speed control system and pass the lead vehicle at his option.

Because the system is responsive to objects appearing in front of the vehicle, the energy beam width must be narrow in order to avoid responses from adjacent lane objects and fixed roadside objects. When the energy source is a microwave radar system, this is provided by a narrow beam antenna. However, even with a narrow beam antenna, there are some instances, such as going around curves, in which the radiation beam will be aimed at a fixed roadside target, such as a sign or lamppost. The system must therefore incorporate a fixed target rejection capability in order to avoid sudden decelerations because of erroneous signals caused by reflections from such targets.

The adaptive speed control system should remain insensitive to signals reflected from targets which are present at an excessive range in front of the vehicle. This can be done by establishing a threshold for the receiver system so that received targets which are below a threshold level do not actuate the receiving circuitry. The inventive system can incorporate a more sophisticated cutoff range system, which is more fully described hereinafter.

DETAILED DESCRIPTION

Figure 1:
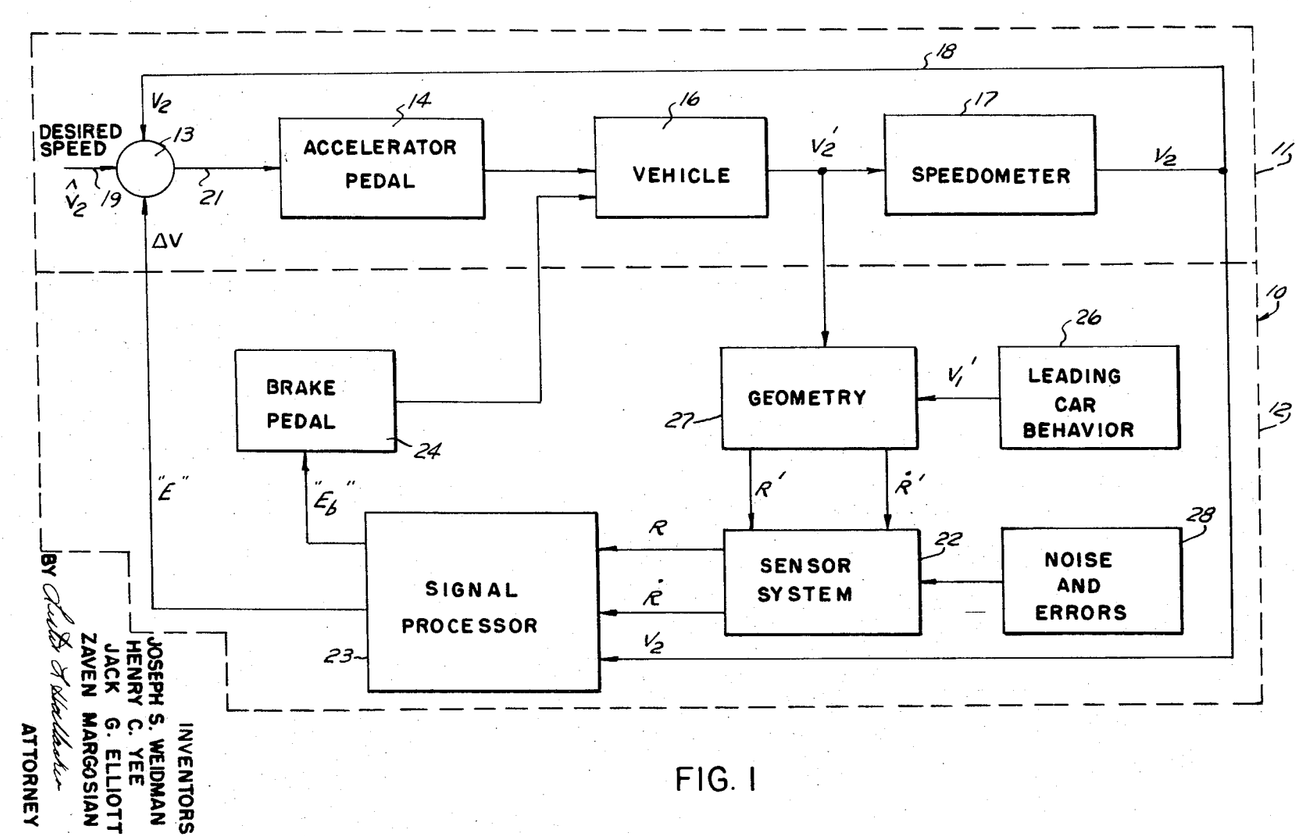
FIG. 1 is a conceptual block diagram of an adaptive speed control system.

FIG. 1 shows a conceptual block diagram of the adaptive speed control system. The speed control system, which is indicated generally by reference numeral 10, is divided into two parts, 11 and 12. The portion indicated by numeral 11 indicates the automatic speed control system of the convenience type explained hereinabove, and several types of which are available. The portion indicated by reference numeral 12 shows the circuitry added to the automatic speed control system to convert it into an adaptive speed control system.

The inventive adaptive speed control system can be best understood by first understanding the automatic speed control system 11 and the other portions of the inventive system which are known in the art.

AUTOMATIC SPEED CONTROL SYSTEM

The Automatic Speed Control System 11 is intended to maintain the forward velocity of the Vehicle 16 at any value selected by the driver. This is accomplished by placing a reference voltage $\hat{V}_2$, which is representative of the desired speed, onto an Input Lead 19 of a Signal Comparator 13. The actual speed $V_2'$ of Vehicle 16 actuates Speedometer 17 of known type, so that a measured velocity $V_2$ is the output of the speedometer.

A sensor, which can be coupled to the speedometer cable, generates a voltage proportional to the measured velocity $V_2$. This voltage is fed back to Voltage Comparator 13. Comparator 13 generates a voltage which is proportional to the difference between the two input voltages, and accordingly generates an error signal when the measured velocity $V_2$ is different from the desired velocity $\hat{V}_2$. The error voltage output from Comparator 13, present on Output Lead 21, serves as an input to the Accelerator Pedal Control 14, so that the velocity of the car is increased or decreased in accordance with the polarity of the error signal. Therefore, as the vehicle attempts to change speed in response to road grades or wind the vehicle is automatically maintained at the selected speed by the system.

Several automatic speed control systems which operate in accordance with the above description are presently available. However, one system which can be used is fully described in U.S. Pat. No. 3,455,411.

SENSOR SYSTEM

Sensor System 22, shown in FIG. 1, is used to determine the range and range-rate between the two vehicles. This system can be optical or microwave but must include the capability of transmitting and receiving energy which is conveniently generated and detected.

Because both range and range-rate information are required, a Doppler radar system is a convenient means of obtaining the required information. A system which completely fulfills the requirements of an adaptive speed control system is fully described in U.S. Pat. No. 3,659,293, fully referenced hereinabove.

The Doppler radar system described in the above-referenced patent application is a Gunn diode Doppler radar system where a variable voltage is applied to the Gunn diode so that two discreet frequencies are transmitted on a time-sharing basis. The energy reflected from the target therefore creates two Doppler frequencies which form a composite signal. The phase relationship of the two Doppler frequencies is indicative of the range between the radar system and the target, while the Doppler frequency is directly related to the relative velocity between the transmitting antenna and the target from which the received energy is reflected. The range and range-rate data are extracted from the received signal and processed to effect the desired vehicle control.

THE ADAPTIVE SPEED CONTROL SYSTEM

The inventive adaptive speed control system shown in the conceptual block diagram of FIG. 1 includes the Automatic Speed Control Section 11 and the Adaptive Speed Control Section 12. Section 12 includes a Sensor System 22, which can be of the type described hereinabove, and a Signal Processing Circuit 23 and a Brake Pedal Actuator 24.

Functional Block 27 is used to indicate the geometry of the vehicular system; that is, the important parameters of the two vehicles which will result in the required range and range-rate information and those which dictate the required control functions. Accordingly, Geometry Block 27 is shown receiving an input $V_2'$, which is the actual velocity of the radar bearing vehicle. An input is also received from the Leading Car Functional Block 26, so that the actual velocity, $V_1'$ of the lead car is input to the system. Because of the operation of Sensor System 22, the $V_2'$ and $V_1'$ information is processed so that range R and range-rate Ṙ information is generated by the sensor system. Because the sensor system is also affected by ambient noise and other errors, Functional Block 28 is used to represent these inputs. Sensor System 22 then generates a Range Signal R and a Range-Rate Signal Ṙ which are input to Signal Processor 23. Signal Processor 23 also receives the measured velocity $V_2$ of the vehicle from the speedometer cable sensor.

If the range and range-rate information are such that the trailing vehicle is falling behind the lead vehicle, or is closing at a rate which can be reduced by decreasing the vehicle accelerator deflection, a Throttle Error Function E is generated and fed to Comparator Circuit 13. The E signal in Circuit 13 will override any signals received from the automatic speed control system and cause the vehicle velocity to change, thus causing trailing Vehicle 16 to assume the optimum safe trailing distance behind the lead vehicle.

If the range and range-rate information show that the trailing vehicle is closing upon the leading vehicle and is within a range which is less than the optimum trailing range so that braking is required, a Brake Function $E_b$ is generated and fed to the Brake Pedal Actuator 24. This input slows the trailing vehicle so that it assumes the optimum trailing distance and follows the speed of the lead vehicle.

Figure 2:
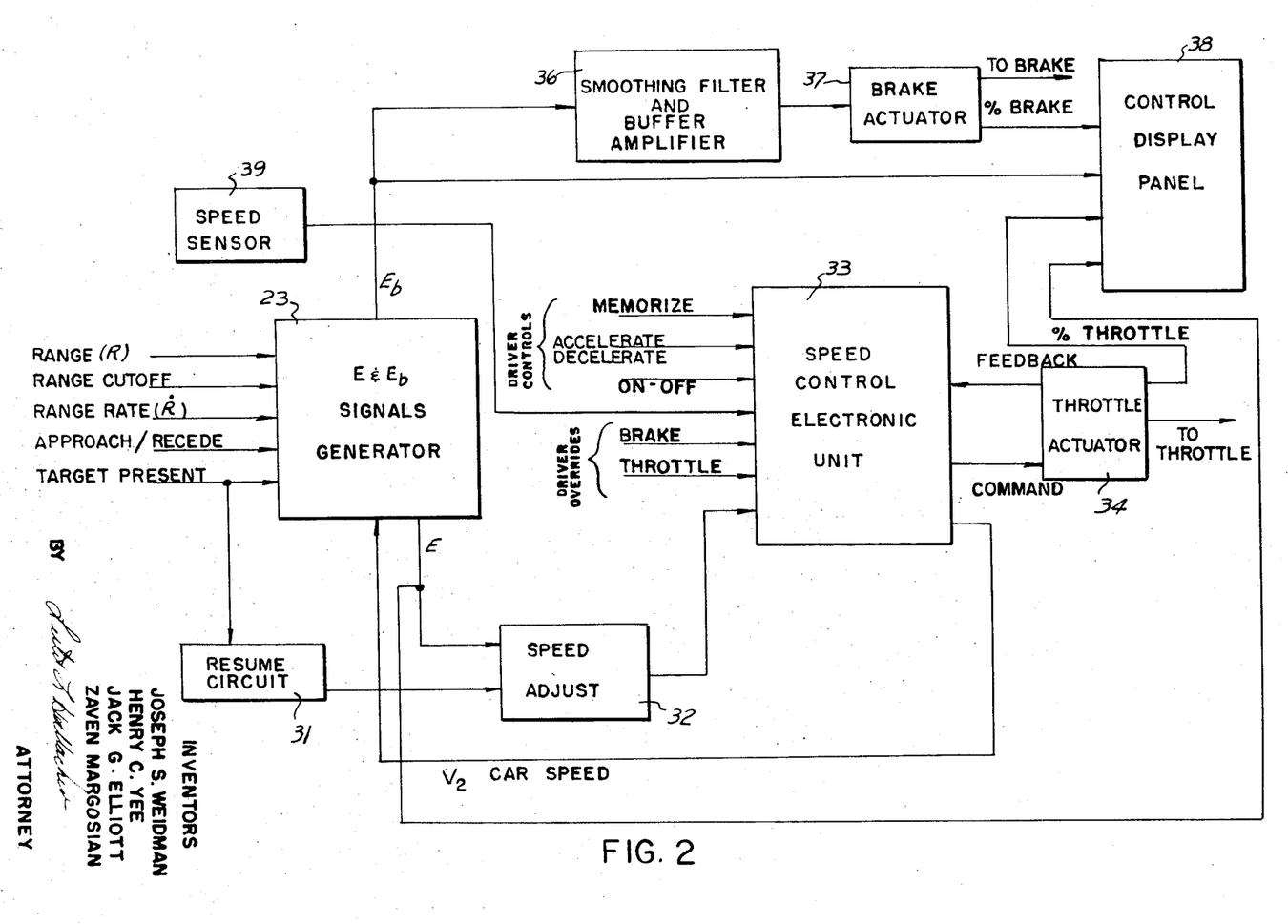
FIG. 2 is a functional block diagram of the adaptive speed control system.

FIG. 2 is a functional block diagram of the inventive adaptive speed control system. The E and $E_b$ Signal Generator 23 is equivalent to Signal Processing Circuit 23 shown in FIG. 1. Signal Generator 23 receives a Range R input, a Range-Rate Ṙ input, an Approach/Recede signal, and a Target Present input from the Sensor System 22 of FIG. 1.

The Range R and Range-Rate Ṙ and Approach/Recede signals are generated from the Doppler information present in the received signal. The Approach/Recede signal is a signal which is indicative of the opening or closing relationship of the two vehicles. The Target Present signal is used to inform the system that a target is present within the operative range of the system, and therefore indicates that a Doppler signal is received and serves to actuate the system and put it into the Adaptive Speed Control Mode.

As is known, the operation of a Doppler radar system is dependent upon the presence of a relative velocity between two objects. The adaptive speed control system described herein simultaneously maintains a constant optimum spacing between two vehicles and also maintains the velocity of a trailing vehicle at the velocity of the leading vehicle. Accordingly, when the system has controlled the trailing car to the point that it is traveling at the same velocity as the lead vehicle, there is no Doppler signal present. In the absence of a provision for this difficulty, the car would then be controlled either by the Automatic Speed Control System of the convenience type explained hereinabove or by environmental parameters, such as hills, grades, wind, etc., which ordinarily affect the velocity of a car. Accordingly, the car would then either accelerate or decelerate with respect to the preceding vehicle, causing the presence of a Doppler signal in the adaptive speed control system. This is an undesirable operation as the car would therefore be hunting about the optimum speed and following distance, causing passenger discomfort.

This is avoided by providing the Adaptive Speed Control System with a memory circuit. When a Target Absent signal is generated in response to the absence of a Doppler signal, the memory is activated to remember the existing signal for a preselected period of time. At the expiration of the time a very small accelerate signal is generated to very slightly accelerate the vehicle. This causes a Doppler signal and also reactivates the Adaptive Speed Control. The acceleration resulting from this generation is very slight and is not noticeable by the occupants of the vehicle.

Referring again to FIG. 2, it is noted that there is a Range Cutoff Input to the Signal Generator 23. The Range Cutoff Signal is used to maintain the sensitivity of the system to within the maximum desired range, such as 250 or 300 feet. A maximum range sensitivity is desired in order to prevent the system from functioning when distant objects first appear within the line of sight of the radar. A system for providing range cutoff is described in application Ser. No. 75,056, filed Sept. 24, 1970. The provision of range cutoff is optional because the inherent system sensitivity provides some range cutoff capability.

The Target Present Signal is fed to a Resume Circuit 31, the output of which actuates Speed Adjust Circuit 32, so that the automatic speed control operation of System 11 of FIG. 1 can be overridden if necessary. Resume Circuit 31 also serves to slightly accelerate the vehicle under the zero Doppler condition explained hereinabove. Speed Adjust 32 actuates the Speed Control Electronic Unit 33 and actuates the system.

Speed Control Unit 33 can be similar to the automatic speed control circuit described in the above-referenced U.S. Pat. No. 3,455,411. This unit receives Driver Control Signals such as On-Off, Accelerate, Decelerate, and Memorize signals. Accordingly, the driver dictates the operation of the system at his option. Furthermore, the circuit receives Driver Override Signals, such as Throttle and Brake, so that the system is automatically overridden at his option without the requirement of additional driver steps beyond those which he would ordinarily assume, such as accelerating or braking the vehicle by actuation of the appropriate pedal.

The car speed $V_2$ is fed back to the E and $E_b$ Signal Generator, so that the E and $E_b$ signals can be generated in accordance with the range and range-rate calculations. The E signal is fed to Speed Adjust 32 which actuates Throttle Actuator 34 through Speed Control Unit 33. This signal then actuates the throttle and changes the speed of the vehicle. It should be noted that the vehicle velocity change executed by Throttle Actuator 34 can either increase or decrease the velocity of the car. In those instances in which some decrease of velocity is required but the decrease is not so drastic as to require a braking action, the automobile accelerator is merely raised above its existing position so that the speed of the car decreases. In those instances in which an increase in velocity is required the accelerator is actuated in the opposite direction to cause an increase in the car speed.

When the information input to E and $E_b$ Generator 23 dictates that a braking action is required, an $E_b$ signal is generated. This signal is smoothed and amplified in the Circuit 36 and then serves to actuate the Brake Actuator 37, which executes the braking function. A braking action is then applied to the vehicle in proportion to the value of the $E_b$ signal so that the car is slowed an amount sufficient for the assumption of the optimum following distance.

A Speed Sensor 39, which is coupled to the speedometer of the vehicle, generates a signal which is proportional to the velocity of the controlled vehicle. This signal is input to Speed Control Unit 33 and used to generate the $V_2$ voltage which is indicative of the vehicle speed.

A Control Display Panel 38 receives inputs from the E and $E_b$ Generator as well as Percent Brake and Percent Throttle Signals from Brake Actuator 37 and Throttle Actuator 34, respectively. Control Panel 38 can therefore include a visual indication so that the driver is aware of the operation of the system. For example, an acceleration signal can be indicated by a green light, a deceleration signal by a red light, and a normal condition signal by a yellow light. The Percent Brake and Percent Throttle Signals can be used to change the intensity of the red and green lights, respectively, and thereby indicate the amount of braking or acceleration which is occurring. Furthermore, Control And Display Panel 38 can include the On and Off Switch, the Accelerate, Decelerate, Memorize, and other controls which are necessary for inputs to the system.

Although it is not apparent from the description of FIG. 2, the system has several very significant advantages. In operating under the control of the speed control system, the driver selects the speed of the vehicle. The adaptive speed control system cannot accelerate the vehicle above this speed. Also, the adaptive speed control system, in some instances, overrides the automatic speed control system. However, the remembered speed selected by the driver is not disturbed, so that automatic control is resumed at the remembered speed when the adaptive control ceases to function. These features are fully described hereinafter.

As explained hereinabove, the inventive system has alternative modes of operation. The controlled vehicle is either brought to a safe following distance behind a lead vehicle or is maintained at a selected cruising speed when no lead vehicle is present. The steady safe following distance is governed by the speed of the lead vehicle. When the distance to the lead vehicle deviates from the desired range or when the two vehicles do not have the same velocity, appropriate commands are automatically sent to the throttle or brake so that the following vehicle assumes the speed of the lead vehicle and maintains the optimum following distance.

The throttle and brake commands are represented by error signals, which are used to maintain the proper vehicle control and are based on a control law using two error functions, E and $E_b$. E is the accelerator error function which is used to control the vehicle by use of the accelerator pedal, and $E_b$ is the brake error function which is used to decelerate the vehicle by use of the brakes. In order to properly utilize the error functions, it is necessary to equate the variables of the system geometry into two usable equations which respectively define the E and $E_b$ functions.

This was accomplished by the use of numerous hybrid computer simulations in which the various variables of the system were changed and the optimum coefficients for the various parameters were defined.

Accordingly, the Throttle and Brake Commands, E and $E_b$ respectively, are based on a control defined as follows:

$$E = R - R_o + 11/3\, \dot{R} \qquad (1)$$
$$E_b = (55 - R - 3\dot{R})/25 \times 100\% \quad (V_2 <_{30}\text{m.p.h.}) \qquad (2)$$
$$E_b = [55 - R - 3\dot{R} + .7(V_2 - 30)] \times 100\% \quad (V_2 > 30 \text{ m.p.h.}) \qquad (3)$$

Where:
$E$ = The accelerator error function
$E_b$ = The brake error function
$R$ = Range of the lead car in feet
$\dot{R}$ = Range-Rate between the two vehicles (positive if range is increasing and negative if range is decreasing)
$R_o$ = Desired range
$V_2$ = Controlled car speed $R_o$, the desired range, defines the following distance for a particular speed and, accordingly, is defined as:

$$R_o = 55 + V_2 \qquad (4)$$

Substituting equation (4) for the $R_o$ value of equation (1) yields:

$$E = R - (55 + V_2) + 11/3\, \dot{R} \qquad (5)$$

The inventive system is designed to provide proper throttle and brake operation based on the E and $E_b$ signals, respectively. The implementation of the Throttle Command is described with respect to FIG. 3, and the implementation of the Brake Command is described with respect to FIG. 4. The E and $E_b$ command functions are limited only by the capability of the automobile engine and braking capabilities.

Figure 3:
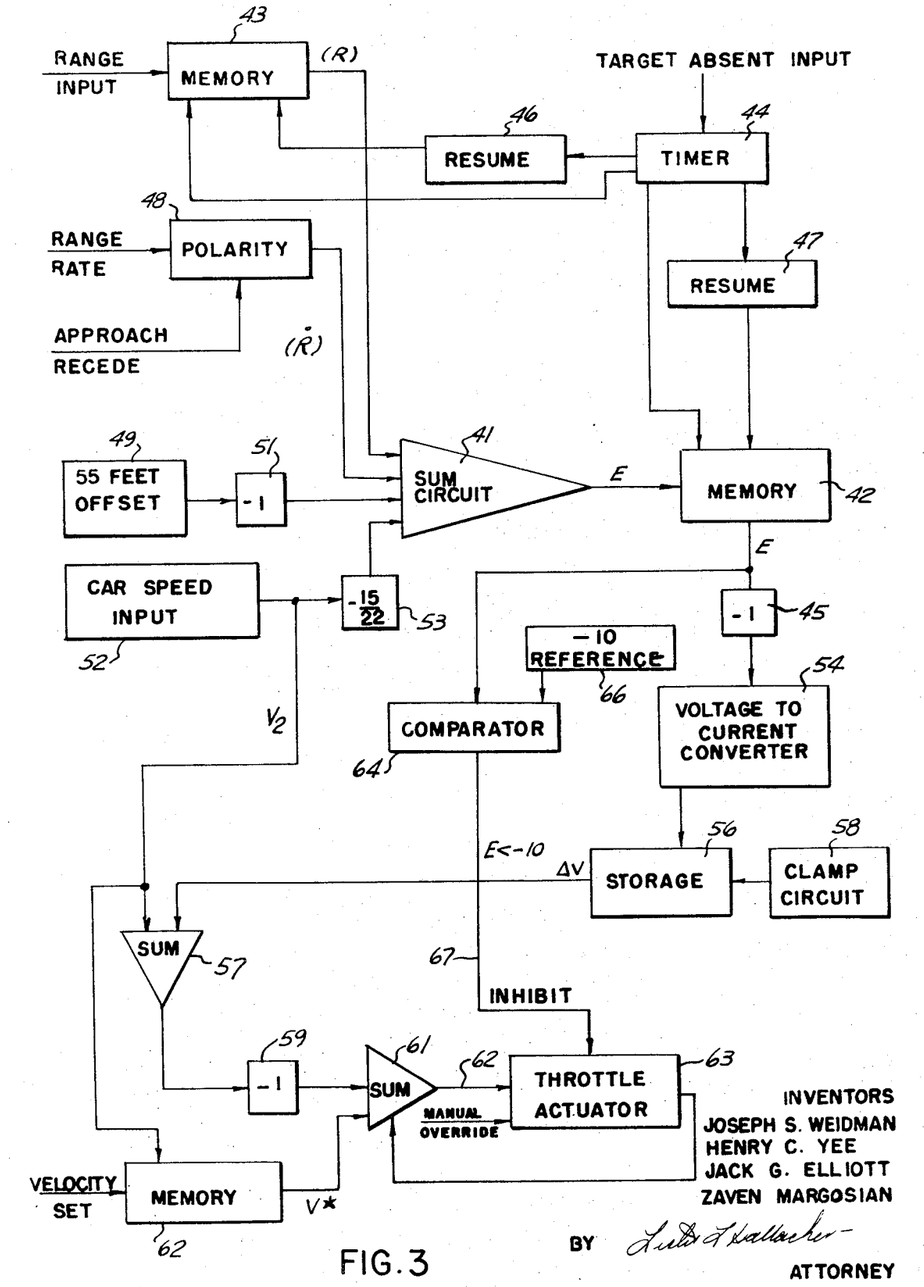
FIG. 3 is a block diagram of a preferred embodiment of the system for generating the throttle control signal.

A block diagram of a preferred embodiment of a system for implementing the Throttle Command Function E is shown in FIG. 3. The system includes a Summing Amplifier 41 which receives four inputs individually indicative of Range $R$, Range-Rate $\dot{R}$, Car Speed $V_2$, and a 55-foot offset. Reference to equation (1) hereinabove shows that these four parameters are those which define the Accelerator Error Function $E$. Accordingly, the output of Summing Amplifier 41 is the Accelerator Error Function $E$. The output of Summing Amplifier 41 serves as an input to Memory Circuit 42.

Memory 42 is a circuit of well known type, for example a charged capacitor, and is used in order to prevent noise from disturbing the $E$ value when the Doppler signal is zero, which occurs when the two vehicles have zero relative velocity.

The range input information which is derived from the Sensor System is fed to a Memory Circuit 43. The output of Memory Circuit 43 serves as the Range $R$ input to Summing Amplifier 41.

Memory 43 receives an input from Timer 44 through a Resume Circuit 46 and also a direct input from Timer 44. Timer 44 also receives a Target Absent input from the Sensor System.

Memory 43, Timer 44, and Resume Circuit 46 cooperate in a manner which enables the adaptive speed control system to maintain control of the vehicle even when the Doppler frequency is zero. This occurs when there is no relative velocity between the lead and following car. When there is a relative velocity between the two vehicles, a Doppler frequency exists and a Range Input is presented to Memory 43. In this condition, the Range Signal $R$ serves as an input to Summing Circuit 41. When the Doppler frequency goes to zero, Timer 44 receives a Target Absent Input so that the timer switches Memory 43 to a memory mode so that the last Range Input is remembered. Accordingly, the Range Output $R$ from Memory 43 remains constant for a preselected period of time determined by Timer 44. At the expiration of the time period, Timer 44 actuates Resume Circuit 43. The output of Resume Circuit 43 actuates Memory 43 so that a very small voltage is added to the stored voltage which represents the remembered Range Input. This results in the appearance of a small range increase and causes the vehicle to very slightly accelerate, resulting in a Doppler frequency. An input to Memory 43 is then available, and the car is under the control of the Adaptive Speed Control System. The voltage input to Memory 43 from Resume Circuit 46 is very small, so that a very slight acceleration of the vehicle is realized. For this reason, the occupants of the vehicle will be unaware of the acceleration and the change of velocity will be undetectable. The desired smooth, comfortable ride of the vehicle therefore is not disturbed by this operation of the system.

The output of Timer 44 actuates a second Resume Circuit 47, the output of which actuates Memory 42. Timer 44 also directly actuates Memory 42. These two inputs to Memory 42 serve to maintain an $E$ output from Memory 42 in those instances in which a Doppler frequency is zero. They also serve to prevent noise from disturbing the E value during these instances. The operation of Memory 42 is very similar to that of Memory 43; that is, the initial output from the timer actuates the circuit so that the $E$ value existing at that time is memorized. This condition remains until the expiration of the timing period, at which time the Resume Circuit 47 is actuated to change the input to Memory 42. The change in input to Memory 42 causes a slight change in the $E$ Control Law Function, resulting in a very slight increase in the velocity of the car as explained hereinabove.

The range-rate information from the system sensor is fed to Polarity Circuit 48. The range-rate information is dependent upon the relative phases between two Doppler frequencies as is explained in application Ser. No. 75,056, filed Sept. 24, 1970, referenced hereinabove. Although the range rate information is indicative of the leading or lagging phase relationship of the two Doppler signals, the polarity of the signal is the same irrespective of the phase relationship. Accordingly, Polarity Circuit 48 also receives the Approach/Recede Signal as an input. When the Approach/Recede Input indicates that the range-rate is closing, the Range-Rate $\dot{R}$ output of Polarity Circuit 48 is positive. When a Recede Signal is indicated, the recede input to Polarity Circuit 48 changes the sign of the range-rate information so that the Range-Rate $\dot{R}$ output is negative.

Referring again to equation (5), it is noted that the equation contains a constant 55 which is used as the minimum distance at which the vehicle separation will be maintained. This input is supplied by the 55-Foot Offset Circuit 49. Because the parameter has a negative value in equation (5), it is inverted by an Inverter 51 so that a negative voltage is applied to the input of Summing Circuit 41. It should be noted that this input is merely a voltage of the proper value and obviously can be a negative voltage, thereby eliminating the necessity for Inverter 51.

Summing Amplifier 41 also receives information indicative of the car speed $V_2$ from Car Speed Input Circuit 52. This input is applied to Summing Amplifier 41 through a Multiplying Circuit 53. Multiplying Circuit 53 multiplies the car speed input by a −15/22 factor to convert the polarity and also to convert miles per hour into feet per second.

Summing Amplifier 41 is now seen to receive inputs which are indicative of range, range-rate, car speed, and the 55-foot offset. Therefore, by properly combining these inputs, the $E$ Acceleration Function defined in equations (1) and (5) is realized as an output from the Summing Amplifier 41. It should be noted that any inputs to Summing Circuit 41 can be passed through scale factor circuits before being input to Summing Circuit 41, so that all inputs are in the proper units allowing for direct algebraic addition.

The $E$ function output received from Memory 42 is directed to a Voltage-To-Current Converter 54 through an Inverter 45. Converter 54 converts the voltage signal representative of the $E$ output to a current signal. The current is directed to a Storage Circuit 56, which can be a capacitor which is charged by the current. Accordingly, the greater the value of $E$, the higher will be the current output from Converter 54, and the faster the Storage Circuit 56 will receive the current. The output of the Storage Circuit 56 is directed to a Summing Amplifier 57. However, the output of a Clamp Circuit 58 is directed to Storage Circuit 56. This input to Circuit 56 is used to prevent the output from going below zero. Accordingly, a positive voltage $\Delta V$ is always fed to Summing Amplifier 57 from Storage Circuit 56. Summing Amplifier 57 also receives an input representative of the car velocity $V_2$. The voltage representative of the sum of these two velocities is fed to an Inverter 59, the output of which serves as an input to another Summing Amplifier 61.

Summing Amplifier 61 receives a second input from Memory Circuit 62, which is actuated by the car speed $V_2$ and a Velocity Set Signal. The Velocity Set Signal is the signal generated by the driver when he sets the automatic speed control system to a desired value. Memory 62 can be a capacitor which is charged by the voltage representative of the speed $V_2$. When the driver desires to select the desired speed at which he is traveling, he closes a switch which applies the velocity set input to the Memory 62 and causes the capacitor to charge to the existing voltage, thereby memorizing that speed.

Summing Amplifier 61 is a difference circuit, in that it yields an output which is representative of the difference between its two inputs. Accordingly, when the input from Summing Circuit 57 is different from the memorized speed, the error voltage, present on Output Terminal 62, is directed to Throttle Actuator 63, which is moved in accordance with the polarity of the output signal from Summing Circuit 61 to accelerate or decelerate the vehicle. The output of Throttle Actuator 63 is fed back to the Summing Circuit 61 so that the change in velocity of the vehicle is smooth and comfortable to the vehicle occupants.

The existence of Summing Circuit 57 and the circuitry which succeeds it in the system result in two unique and important characteristics of the system. Firstly, the automobile cannot be accelerated to a speed above that selected by the driver. Secondly, changes in the velocity of the car dictated by the Adaptive Speed Control System do not affect the speed set by the driver into Memory 62. These operational characteristics are attained because of Summing Circuits 57 and 61, and also because the Clamp Circuit 58 prevents the output from Storage 56 from going below zero. Assume, for example, that the set velocity $V_2$ is 70 miles per hour, and the output from Storage 56 is representative of a $\Delta V$ velocity of 1 mile per hour. This could happen because the lead vehicle has accelerated or because of a downhill slope of the road. In this condition, the output of Summing Amplifier 57 will be representative of 71 miles per hour. This is inverted from Inverter 59 and fed into Summing Amplifier 61. The memorized speed input $V^*$, which is the output of Memory 62, remains at the selected 70 miles per hour. Accordingly, the output of Summing Amplifier 61 will be −1 mile per hour, causing the Throttle Actuator 63 to decelerate the vehicle until the actual speed $V_2$ is 69 miles per hour. This has occurred without destroying the memorized velocity $V_2$ within the Memory Circuit 62.

Assuming a condition wherein the controlled vehicle comes up upon a slower moving vehicle, the voltage present on the output terminal from Storage Circuit 56 will be representative of the required decrease in velocity. Assuming that the velocity must be decreased to 69 miles per hour, the output of Storage 56 will then be +1 miles per hour, which is fed to Summing Amplifier 57. The output of Summing Amplifier 57 is then 71 miles per hour. The output of Inverter 59 is then −71 miles per hour. Because $V^*$ is 70 miles per hour, the output of Summing Amplifier 61 is −1 miles per hour, causing a deflection by Throttle Actuator 63 such that the car decelerates until the car has an actual speed of 69 miles per hour.

Assuming a condition wherein the controlled vehicle is slowed by road conditions, such as wind or an uphill grade, from 70 miles per hour to 69 miles per hour, the $V_2$ input to Summing Amplifier 57 is 69 miles per hour. Since there is no desired decrease in velocity, the output of Storage 56 $\Delta V$ is zero. Therefore, the output of Inverter 59 is −69 miles per hour. Since $V^*$ is 70 miles per hour, as set by the driver, the output of Summer 61 is +1 miles per hour. This output causes the Throttle Actuator to accelerate the vehicle until $V_2$ is again 70 miles per hour.

The output of Summing Amplifier 62 present on the Output Terminal 62 is a velocity error signal which is used to adjust the throttle position. To an approximation, the error signal is primarily a function of speed error. The Throttle Command Signal $T_c$ therefore can be represented as:

$$T_c = V_2^* - V_2 \qquad (6)$$

Where:
$V_2$ = the velocity of the vehicle, and
$V_2^*$ = the velocity set by the driver.

If the error is negative, indicating that the car speed is too high, the throttle releases by an amount that is related to the magnitude of the error.

When conditions are such that the car must be reduced by a speed $\Delta V$, a desired speed $V'$ can be defined as $V' = V_2^* - \Delta V$. If $V'$ is used as the desired speed in the Throttle Command $T_c$, equation (6), the resulting function is:

$$T_c = V' - V_2 = (V_2^* - \Delta V) - V_2;$$

$$T_c = V_2^* - (V_2 + \Delta V) \qquad (7)$$

It can therefore be seen that the car speed can be adjusted by an amount $\Delta V$ without altering the value $V_2^*$ established by Memory 62. This is the implementation that is used to control the Throttle Actuator Circuit 63 explained hereinabove.

The $E$ error function output from Memory 42 also serves as an input to Comparator Circuit 64. Comparator 64 also receives a −10 Reference Input from Reference Source 66. Comparator 64 is such that its output is zero when the voltage input representative of $E$ is greater than −10. However, when $E$ is less than, or more negative than, −10 an output voltage is present on Output Lead 67 of Comparator 64. This signal serves as an input to Throttle Actuator 63 and is used to inhibit the actuation of the throttle and return the throttle to zero deflection.

Examination of equation (1) shows that the error function $E$ becomes negative only when the desired rate $R_o$ exceeds the total of the Range $R$ and the Range-Rate $\dot{R}$ signals. In the instances where the desired Range $R_o$ exceeds the total of range and range-rate information by 10 or less, the deceleration required can be accomplished by deactuating Throttle Actuator 63 an amount sufficient to decrease the acceleration of the car.

In instances when Throttle Error Function $E$ is more negative than −10, the vehicle may possibly be slowed sufficiently to avoid a collision by entering the system into coast mode. However, in certain instances a braking mode is required to avoid a collision.

In the coast mode, Throttle Actuator 63 has returned the accelerator to zero deflection. However, the Brake Error Function $E_b$ does not assume control of the system because $E_b$ as defined in equation (3) is not positive. The vehicle therefore coasts down to a safe velocity. In the event that coasting is not sufficient to slow the car down to avoid a collision, the braking mode is entered into. This occurs when the parameters of equation (3) cause $E_b$ to become positive.

Figure 4:
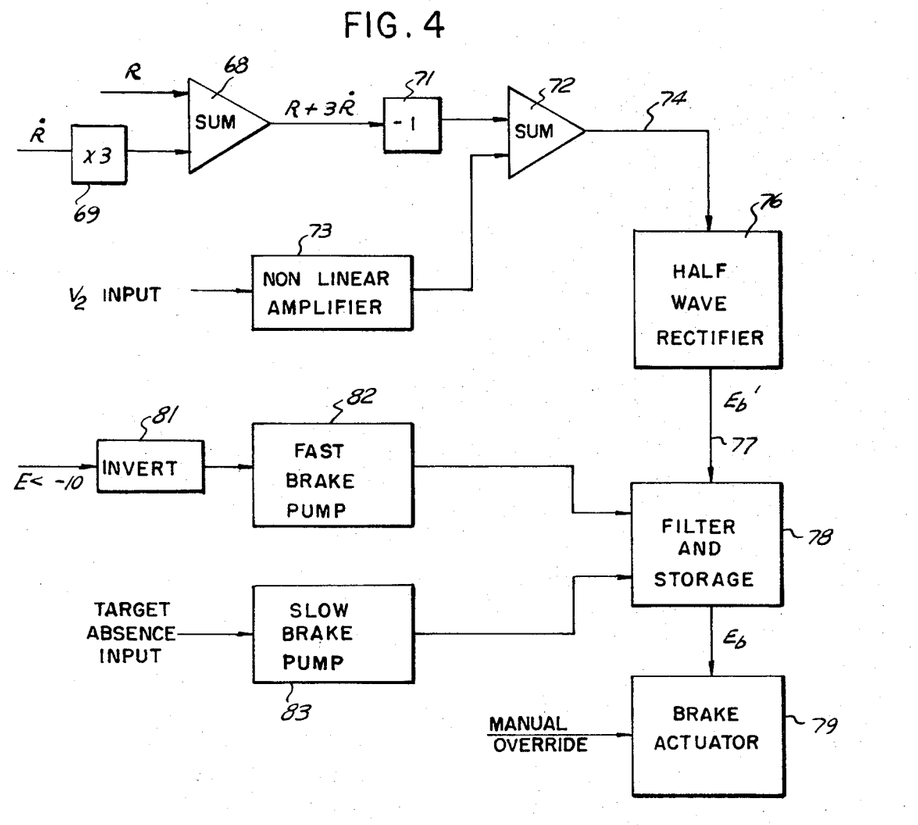
FIG. 4 is a block diagram of a preferred embodiment of the system for generating the brake control signal.

FIG. 4 shows a preferred embodiment of a system for generating the $E_b$ Brake Command function. The Range $R$ is fed directly to a Summer 68, while the Range-Rate $\dot{R}$ signal is fed to Summer 68 through a Multiplying Circuit 69 which multiplies by 3. The output of Summing Circuit 68 is therefore an $R + 3\dot{R}$ factor. The sum of these signals is inverted in Inverter 71 and is then fed to a Summing Circuit 72. The $R + 3\dot{R}$ factors can also be obtained from the throttle control within the $E$ Function Generator of FIG. 3.

Reference to equations (2) and (3) shows that the definitions of $E$ and $E_b$ require a $-(R + 3\dot{R})$ factor and a constant 55, which is the desired range. Equation (3) also requires a $0.7(V_2 - 30)$ factor. These factors are obtained by Nonlinear Amplifier 73 which receives a $V_2$ velocity input.

Figure 5:
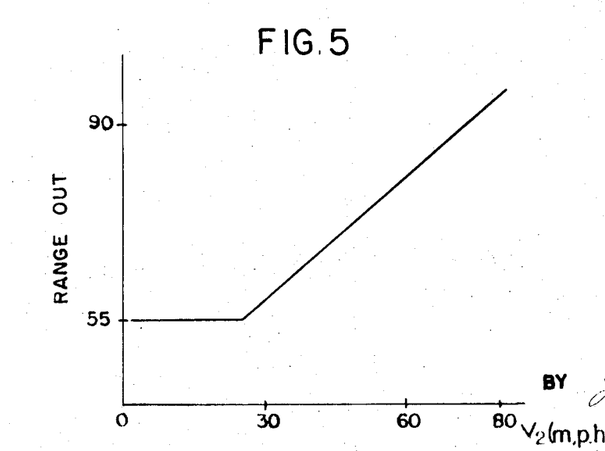
FIG. 5 is a graph of the response of a nonlinear amplifier used in the system.

Nonlinear Amplifier 73 has an output characteristic illustrated in FIG. 5. For all values of $V_2$ which are less than 30 miles per hour, the output of the amplifier is a constant 55 as required by equations (2) and (3). After the input to Amplifier 73 exceeds a voltage representative of 30 miles per hour, the output increases linearly with a 0.7 slope so that the output is consistent with equation (3). Accordingly, voltages consistent with equations (2) and (3) are present on the Output Terminal 74 of Summing Amplifier 72, depending upon the velocity $V_2$ input to Nonlinear Amplifier 73.

The output from Summer 72 is injected into a Half-wave Rectifier 76 which is used to reject all negative values of the input voltage present on Output Terminal 74. The output of Half-wave Rectifier 76 which is present on Output Line 77 is therefore either positive or zero, depending upon the Velocity Input $V_2$ to Nonlinear Amplifier 73.

The rejection of the negative values of inputs by Half-wave Rectifier 76 is important, because it helps to maintain separation between the operation of the Throttle Command E and Brake Command $E_b$. This is apparent from considering equations (1), (2), and (3). In equations (2) and (3), when the sum $R + 3\dot{R}$ exceeds the total of $55 + 0.7(V_2 - 30)$, a negative value is obtained for the $E_b$ function. However, if the E function is less negative than $-10$, the Throttle Actuator 63 in FIG. 3 is capable of decelerating the vehicle by the required amount, and therefore the Throttle Command Function E dictates the operation of the car rather than the Brake Command Function $E_b$. In these instances, the output from Summing Amplifier 72 in FIG. 4 is negative, and therefore is rejected by the Half-wave Rectifier 76 so that the $E_b$ function does not enter into the operation of the system. The E Throttle Command is therefore free from any influence of the $E_b$ Brake Command.

When the $E_b$ function is more negative than $-10$, braking may be required, and the $E_b$ function takes command of the system when braking is required. In these instances, the output from Summer 72 is positive, and therefore an output is realized from Half-wave Rectifier 76 so that the $E_b$ function takes command of the system.

As was explained with respect to FIG. 3, in those instances in which the E function is more negative than $-10$, Comparator 64 generates a signal inhibiting Throttle Actuator 63 so that E is no longer in command of the system. The $E_b$ Brake Command therefore is free from any influence from the E Throttle Command.

The output from Rectifier 76 is injected into a Filter and Storage Circuit 78, where it is integrated and smoothed to remove errors and extraneous noises. The output of Filter 78 is therefore the $E_b$ Brake Function. This signal is input to Brake Actuator 78 to brake the automobile. The braking of the automobile is proportional to the voltage level of the $E_b$ signal.

Referring to FIG. 4, the signal which is generated by Comparator 64 of FIG. 3 when the Accelerator Function E is less negative than $-10$ is fed to an Inverter 81, the output of which actuates a Fast Dump Circuit 82. Dump Circuit 82 then generates an output which is directed to Filter 78 so that the braking function is immediately dumped or shorted to ground. This operation is preferred because the hard braking of the vehicle causes a rapid deceleration so that the range between the two vehicles increases rapidly. Accordingly, when the range is approaching the optimum range, braking is no longer required and the car goes into a coast mode. The accelerator pedal has no effect on the vehicle velocity, because it has been returned to its normal position by the inhibit signal on Output Terminal 67 of Comparator 74 shown in FIG. 3. The braking function therefore is no longer needed and would be objectionable over an extended period of time, and therefore it is rapidly dumped.

The Target Absent Input which is injected into Timer 44 in FIG. 3 is also injected into Slow Dump Circuit 83 of FIG. 4. The output of this circuit slowly removes the Braking Function $E_b$ from Filter 78. The operation of Slow Dump Circuit 83 becomes important when the target is no longer present but the output from Comparator 64 of FIG. 3 has never indicated an E function which is more positive than $-10$. In these instances, because there is no longer a target present, a braking function is not desired, and therefore its removal is effected by the use of the Target Absent Input and the Slow Brake Dump Circuit 83.

It should be noted that both Throttle Actuator 63 of FIG. 3 and Brake Actuator 79 of FIG. 4 are provided with manual override inputs so that the driver of the car can override the Adaptive Speed Control System by actuating the vehicle accelerator or brake pedal.

The operation of the system can now be briefly explained as follows with reference to FIG. 3. A Summing Circuit 41 receives a Range, Range-Rate, Optimum Following Range Input, and Car Speed Input, and sums these inputs to yield the accelerator function E given in equation (1). The voltage representative of the sum of these inputs is converted to a current which then charges a Storage Circuit 56 so that the output of the storage circuit is dependent upon the E function, and accordingly the acceleration of the vehicle is directly dependent upon the magnitude of the function E. The output from the Storage Circuit 56 is injected into a Summing Circuit 57 along with a voltage representative of the velocity $V_2$ of the vehicle. The algebraic addition of these two inputs by Summing Circuit 57 is used to actuate Inverter 59 which serves as an input to a Summing Circuit 61. Summing Circuit 61 also receives its output from a Memory Circuit 62 which contains a desired velocity set by the driver. The output of Summing Circuit 61 then actuates the Throttle Actuator 63 to accelerate or decelerate the vehicle in accordance with the polarity of the output from Summing Circuit 57.

A Clamp Circuit 58 prevents the output from Storage Circuit 56 from going negative and therefore the output of Summer 57 is controlled so that the automobile cannot be accelerated above a velocity set by the driver into Memory Circuit 62.

Control of the vehicle is transferred from the E to the $E_b$ function by use of a Comparator Circuit 64 which sends an inhibit signal to Throttle Actuator 63 when the E function has assumed a value which is more negative than $-10$.

After Comparator 64 generates an inhibit signal, $E_b$ may be positive or negative. If $E_b$ is negative the vehicle coasts. If $E_b$ is positive a signal is generated and is applied to Brake Actuator 79 to brake the vehicle in accordance with the magnitude of the $E_b$ signal. Braking continues until the output from Comparator 64 falls below the −10 value which actuates an Inverter 81 and Fast Dump Circuit 82 to cause the braking function to be dumped. Braking then ceases and the car goes into a coast mode. Alternatively, if the $E_b$ function is not dumped by Fast Dump 82 a Target Absent Signal generated during a zero Doppler frequency condition actuates a Slow Dump Circuit 83 which slowly dumps the signal in Filter 84, removing the $E_b$ function from control of the system.

Because the Doppler frequency is reduced to zero, under the conditions intended by the system, the car would hunt about a preselected velocity in such instances. This is prevented by providing the system with a Timer 44 and a Resume Circuit 46 which are used to actuate a Memory 43. When the Doppler signal is zero, the Target Absent input to Timer 44 actuates the timer so that Memory 43 is actuated to remember the range information present at that time. After a preselected time of operation in this condition, Timer 44 generates a signal which actuates Resume Circuit 43, the output of which actuates Memory 43 so that a slight accelerating signal is called for in the system. This slight acceleration causes a Doppler signal to be generated, thereby removing the memory function. The acceleration of the vehicle causes an error to be generated so that the car slows down to the desired following distance and speed. The increase in acceleration is so slight that it is unnoticeable to the driver and the occupants of the vehicle.

The Adaptive Speed Control System is now seen to be capable of overriding the automatic control system of the convenience type, but is incapable of accelerating the vehicle beyond a velocity selected by the driver in setting the automatic speed control system. Furthermore, the Adaptive Speed Control System and the automatic speed control system can both be overridden by manual inputs by the driver to the throttle or the brake. Another basic advantage of the inventive Adaptive Speed Control System is the fact that the preselected memorized speed set by the driver is not disturbed by the operation of the Adaptive Speed Control System, so that after the operation of the system has been effected and the lead car is no longer a factor in the total environment of the vehicle, the following vehicle will automatically revert to the control of the Automatic Speed Control System at the previously selected speed.

What is claimed is:

1. An adaptive system for maintaining an optimum spacing between a lead vehicle and a trailing vehicle and for causing said trailing vehicle to assume the velocity of said lead vehicle, said adaptive system operating in cooperation with an automatic speed control system which maintains said trailing vehicle at a driver selected speed; said adaptive system comprising:
   means for measuring the range and range-rate between said vehicles;
   means for generating a throttle error signal and a brake error signal in response to the output of said means for measuring range and range-rate, said means for generating including means for preventing said adaptive system from accelerating said trailing vehicle to a speed above said driver selected speed;
   said means for generating yielding said throttle error signal when the difference in speed between said vehicles can be reduced to zero by changing the throttle deflection of said trailing vehicle, and said means for generating yielding said brake error signal when the difference in velocity between said vehicles is a closing velocity which requires actuation of the brake system of said trailing vehicle.

2. The system of claim 1 wherein said means for generating includes means for storing a voltage representative of said driver selected speed; and means for preventing said throttle error signal and said brake error signal from affecting said voltage representative of velocity so that said selected speed is automatically resumed when said throttle error signal and said brake error signal do not control said trailing vehicle.

3. The system of claim 1 wherein said means for preventing includes first signal summing means, said first summing means receiving signal representative of said trailing vehicle velocity and a signal representative of said throttle error signal and generating a sum output; and means for subtracting said sum output from a voltage representative of said selected speed; means for maintaining a constant polarity of said signal representative of said throttle error signal, so that said signal representative of said trailing vehicle speed never exceeds said signal representative of said selected speed; and the output of said means for subtracting is a throttle deflection signal which accelerates and decelerates said trailing vehicle to maintain said optimum spacing and assume said lead vehicle speed.

4. The system of claim 3 wherein said means for subtracting includes an inverter for inverting said sum output and a second summing means receiving the output of said inverter and said voltage representative of said selected speed so that the output of said second summing means is said throttle deflection signal.

5. The system of claim 1 wherein said means for preventing includes a storage circuit for receiving said throttle error signal and generating said signal representative of said throttle error signal in accordance with the magnitude of said throttle error signal; and first signal summing means receiving the output of said storage circuit and a voltage representative of the velocity of said trailing vehicle.

6. The system of claim 3 wherein said means for preventing further includes signal storage means for receiving said throttle error signal and generating said signal representative of said throttle error signal; and means for inhibiting the output of said storage means from going below zero volts.

7. The system of claim 3 wherein said signal representative of said selected velocity is fed to a memory circuit, said memory circuit including a velocity set control so that the driver of said trailing vehicle can set said memory circuit at any selected speed; the output of said memory circuit serving as the signal representative of said selected speed input to said means for subtracting so that the signal stored in said memory circuit is unaffected by changes in said throttle error signal and said brake error signal.

8. The system of claim 1 further including a signal comparator circuit receiving said throttle error signal and a reference throttle signal, said reference throttle signal being correlative of a maximum level of said throttle error signal, said signal comparator generating an inhibit output when said throttle error signal exceeds said reference throttle signal;
throttle control means responsive to said throttle error signal to control the velocity of said trailing vehicle, said throttle control means receiving said inhibit output so that said throttle control means is inhibited when said throttle error signal exceeds said reference throttle signal.

9. The system of claim 7 further including a signal comparator circuit receiving said throttle error signal and a reference throttle signal, said reference throttle signal being correlative of a maximum level of said throttle error signal, said signal comparator generating an inhibit output when said throttle error signal exceeds said reference throttle signal;
throttle control means responsive to said throttle error signal to control the velocity of said trailing vehicle, said throttle control means receiving said inhibit output so that said throttle control means is inhibited when said throttle error signal exceeds said reference throttle signal.

10. The system of claim 3 further including a signal comparator circuit receiving said throttle error signal and a reference throttle signal, said reference throttle signal being correlative of a maximum level of said throttle error signal, said signal comparator generating an inhibit output when said throttle error signal exceeds said reference throttle signal;
throttle control means responsive to said throttle error signal to control the velocity of said trailing vehicle, said throttle control means receiving said inhibit output so that said throttle control means is inhibited when said throttle error signal exceeds said reference throttle signal.

11. The system of claim 1 wherein said means for measuring range and range-rate is a Doppler radar system, the Doppler signal being zero when the relative velocity between said lead vehicle and said trailing vehicle is zero;
and further including means for preventing said adaptive system from losing control of said trailing vehicle when said Doppler signal is zero.

12. The system of claim 11 wherein said means for preventing includes a range memory; timing means for actuating said range memory to store the latest range input when said Doppler goes to zero; and means for generating a small throttle control signal after a prescribed period of time so that said trailing vehicle increases slightly in speed to produce another range input and thereby enable said adaptive system to retain control of said trailing vehicle.

13. The system of claim 12 where said means for generating a small throttle control signal is a resume circuit actuated by said timer, said timer actuating said resume circuit a preselected period of time after said Doppler goes to zero so that said resume circuit generates said small throttle signal and thereby actuates said range memory.

14. The system of claim 1 wherein said means for measuring range and range-rate is a Doppler radar system, said radar system generating an approach/recede signal indicative of the opening or closing relative velocity of said vehicles.

15. The system of claim 14 further including a polarity circuit receiving said range-rate signal;
said polarity circuit receiving said approach/recede signal so that the polarity of the output of said polarity circuit is changed from positive for a receding relationship of said vehicles to negative for a closing relationship of said vehicles by said approach/recede signal.

16. The system of claim 7 wherein said means for maintaining further includes signal storage means for receiving said throttle error signal and generating said signal representative of said throttle error signal; and means for inhibiting the output of said storage means from going below zero volts.

17. The system of claim 13 wherein said means for measuring range and range-rate is a Doppler radar system, said radar system generating an approach/recede signal indicative of the opening or closing relative velocity of said vehicles.

18. The system of claim 17 further including a polarity circuit receiving said range-rate signal;
said polarity circuit receiving said approach/recede signal so that the polarity of the output of said polarity circuit is changed from positive for a receding relationship of said vehicles to negative for a closing relationship of said vehicles by said approach/recede signal.

19. The system of claim 1 wherein said brake error signal actuates a brake actuator circuit through brake error processing means.

20. The system of claim 19 wherein said brake error processing means includes signal polarity responsive means, said polarity responsive means passing only positive signals so that said throttle error signal and brake error signal individually control said trailing vehicle.

21. The system of claim 8 wherein said brake error signal actuates a brake actuator circuit through brake error processing means, and wherein said brake error processing means includes signal polarity responsive means, said polarity responsive means passing only positive signals so that said throttle error signal and brake error signal individually control said trailing vehicle.

22. The system of claim 21 further including brake error signal storage means;
and means for rapidly discharging said brake error storage means, said means for discharging receiving said inhibit output to rapidly discharge said brake error storage means when said brake error signal falls below said reference throttle signal.

23. The system of claim 21 wherein said means for measuring range and range-rate produces a target absent signal when the difference in speed between said vehicles is zero;
and further including brake error storage means;
and means for slowly discharging said brake error storage means;
said means for slowly discharging receiving said target absent signal so that said brake error signal is discharged from said brake error storage means.

24. The system of claim 23 further including brake error signal storage means;

and means for rapidly discharging said brake error storage means, said means for discharging receiving said inhibit output to rapidly discharge said brake error storage means when said brake error signal falls below said reference throttle signal.

25. The system of claim 21 further including a brake error summing circuit receiving said range and range-rate signals and the output of a nonlinear amplifier; the output of said brake error summing circuit actuating said polarity sensitive circuit.

26. The system of claim 25 wherein said nonlinear amplifier receives the speed of said trailing vehicle as an input, and the output of said amplifier is constant for all speeds below a selected speed and linearly increases above said selected speed.

27. The system of claim 26 wherein said polarity responsive circuit is a half-wave rectifier.

28. A noncooperative adaptive speed control system for maintaining a safe trailing distance between a lead vehicle and a following vehicle and for maintaining said trailing vehicle at the velocity of said lead vehicle comprising:
means for transmitting energy to said lead vehicle and receiving energy reflected from said lead vehicle;
means for processing said reflected energy to generate a throttle control function ($E$) and brake control function ($E_b$), said throttle control function being defined as:
$E = R - R_o + 11/3\, \dot{R}$
and said brake control function being defined as:
$E_b = (55 - R - 3\dot{R})/25 \times 100\%$ when the velocity ($V_2$) of said trailing vehicle is less than 30 miles per hour, and
$E_b = [55 - R - 3\dot{R} + 0.7(V_2 - 30)]/25 \times 100\%$ when the velocity ($V_2$) of said trailing vehicle exceeds 30 miles per hour,
where:
$E =$ said throttle control function
$E_b =$ said brake control function
$R =$ range to lead car in feet
$\dot{R} =$ range-rate between said vehicles
$R_o =$ desired range
$V_2 =$ speed of said trailing car.

29. The system of claim 28 wherein the desired range ($R_o$) is defined by:

$$R_o = 55 + V_2$$

where:
55 is a constant, in feet, minimum spacing between said vehicles, and
$V_2$ is the speed, in miles per hour, of said trailing car.

30. The system of claim 28 wherein said means for transmitting and receiving is a Gunn diode Doppler radar system.

* * * * *